United States Patent
Kim

(10) Patent No.: US 10,160,402 B2
(45) Date of Patent: Dec. 25, 2018

(54) REAR CAMERA DEVICE FOR VEHICLE AND MODULE COVER THEREOF

(71) Applicant: HYUNDAI MOBIS Co., Ltd., Yongin-si, Gyeonggi-do (KR)

(72) Inventor: Jee Chul Kim, Yongin-si (KR)

(73) Assignee: HYUNDAI MOBIS Co., Ltd., Yongin-si (KR)

( * ) Notice: Subject to any disclaimer, the term of this patent is extended or adjusted under 35 U.S.C. 154(b) by 130 days.

(21) Appl. No.: 15/288,959

(22) Filed: Oct. 7, 2016

(65) Prior Publication Data

US 2017/0101062 A1  Apr. 13, 2017

(30) Foreign Application Priority Data

Oct. 7, 2015 (KR) ........................ 10-2015-0141215

(51) Int. Cl.
| | |
|---|---|
| H04N 9/47 | (2006.01) |
| H04N 7/18 | (2006.01) |
| B60R 11/04 | (2006.01) |
| B60S 1/04 | (2006.01) |
| B60S 1/58 | (2006.01) |
| H04N 5/225 | (2006.01) |
| B60R 11/00 | (2006.01) |

(52) U.S. Cl.
CPC ............ *B60R 11/04* (2013.01); *B60S 1/0491* (2013.01); *B60S 1/583* (2013.01); *H04N 5/2253* (2013.01); *B60R 2011/004* (2013.01); *B60R 2011/0047* (2013.01)

(58) Field of Classification Search
CPC ............ B60R 11/04; B60R 2011/0047; B60R 2011/004; H04N 5/2253; B60S 1/583; B60S 1/0491
USPC ........................................... 348/148
See application file for complete search history.

(56) References Cited

U.S. PATENT DOCUMENTS

2006/0250500 A1* 11/2006 Gloger .................. H04N 7/183
                                                    348/148
2010/0095471 A1*  4/2010 Reid ..................... B60S 1/0488
                                                   15/250.31

* cited by examiner

*Primary Examiner* — Jared Walker
(74) *Attorney, Agent, or Firm* — Knobbe Martens Olson & Bear LLP

(57) ABSTRACT

Disclosed is a rear camera module for a vehicle. The disclosed rear camera module includes a module cover mounted to a rear side of the vehicle such that a rotational shaft of a rear wiper is rotatably coupled to the module cover and a rear camera module installed at the module cover to photograph a rear-view image of the vehicle. The rear camera module can be easily and conveniently installed at the rear side of the vehicle.

8 Claims, 3 Drawing Sheets

REAR CAMERA DEVICE FOR VEHICLE AND MODULE COVER THEREOF

CROSS-REFERENCE TO RELATED APPLICATION

This application claims priority to Korean Patent Application No. 10-2015-0141215 filed on Oct. 7, 2015 in the Korean Intellectual Property Office, the disclosure of which is incorporated herein by reference.

BACKGROUND

1. Field

The present invention relates to a rear camera device for a vehicle.

2. Description of the Related Art

Generally, a rear camera module is mounted to a rear side of a vehicle to photograph a rear-view image of the vehicle when the vehicle is in a reverse driving mode, in order to provide the photographed image to a driver. Typically, when a transmission lever is shifted to a reverse driving position, the rear camera module photographs a rear-view image of the vehicle. The photographed image is displayed on a display device installed in a passenger compartment and, as such, the driver may secure a rear view of the vehicle without turning his head.

SUMMARY

One aspect of the invention provides a rear camera device for a vehicle, which is capable of achieving easy and convenient installation of a rear camera at a rear side of the vehicle.

Aspects of the present invention are not limited to the above-described aspects, and other aspects of the present invention not yet described will be more clearly understood by those skilled in the art from the following detailed description.

In one aspect of the present invention, the above and other objects can be accomplished by the provision of a rear camera device for a vehicle including a module cover mounted to a rear side of the vehicle such that a rotational shaft of a rear wiper is rotatably coupled to the module cover and a rear camera module installed at the module cover to photograph a rear-view image of the vehicle.

The rear camera module may be disposed in a space defined in the module cover.

The module cover may be formed with an opening at a portion thereof corresponding to a lens of the rear camera module.

The rear camera device may further include a grommet inserted into a cover hole formed through the module cover such that an upper end of the grommet protrudes upwards from the module cover. The grommet may surround the rotational shaft while allowing the rotational shaft to rotate.

The rear camera device may further include a cable connected to the rear camera module while extending through the grommet, to apply a control signal to the rear camera module.

The module cover may be coupled to a rear window.

The rear camera module may be disposed in a space defined between the module cover and the rear window.

The module cover is formed with a mounting portion to be inserted into a mounting hole formed through the rear window. A fastening nut may be fastened to the mounting portion, to couple the module cover to the rear window.

The rear camera module may further include a first watertight pad interposed between the rear window and the module cover. The mounting portion may extend through the first watertight pad.

The rear camera module may further include a second watertight pad interposed between the rear window and the fastening nut. The mounting portion may extend through the second watertight pad.

Another aspect of the present invention provides a module cover for a vehicle mounted to a rear window of the vehicle, to photograph a rear-view image of the vehicle, the module cover receiving a rotational shaft of a rear wiper while allowing the rotational shaft to rotate.

Detailed matters of other embodiments may be apparent from the following description and the accompanying drawings.

In the vehicle according to embodiments of the present invention, the rear camera module is installed at the module cover, which receives the rotational shaft of the rear wiper. Accordingly, the process of mounting the rear camera module may be simplified.

In addition, the exterior design of the vehicle may be improved because the rear camera module is not exposed to the outside.

Effects of the present invention are not limited to the above-described effects. Other effects not yet described may be clearly understood by those skilled in the art from the accompanying claims.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF EMBODIMENTS

Reference will now be made in detail to embodiments, examples of which are illustrated in the accompanying drawings. However, the present disclosure may be embodied in many different forms and should not be construed as limited to the embodiments set forth herein. Rather, these embodiments are provided so that this disclosure will be thorough and complete, and will fully convey the scope of the disclosure to those skilled in the art. The present disclosure is defined only by the categories of the claims. In certain embodiments, detailed descriptions of device constructions or processes well known in the art may be omitted to avoid obscuring appreciation of the disclosure by a person of ordinary skill in the art. Wherever possible, the same reference numbers will be used throughout the drawings to refer to the same or like parts.

Hereinafter, a rear camera device according to an embodiment of the present invention will be described with reference to the accompanying drawings.

Typically, the rear camera module is mounted to a trunk lid for opening or closing a trunk, which is disposed at a rear portion of the vehicle, as a space for storing goods. For this reason, there are problems in that it is necessary to form, though the trunk lid, a hole for mounting the rear camera module, and the exterior design of the vehicle is degraded because a lens part of the rear camera module protrudes rearwards.

Figure 1:
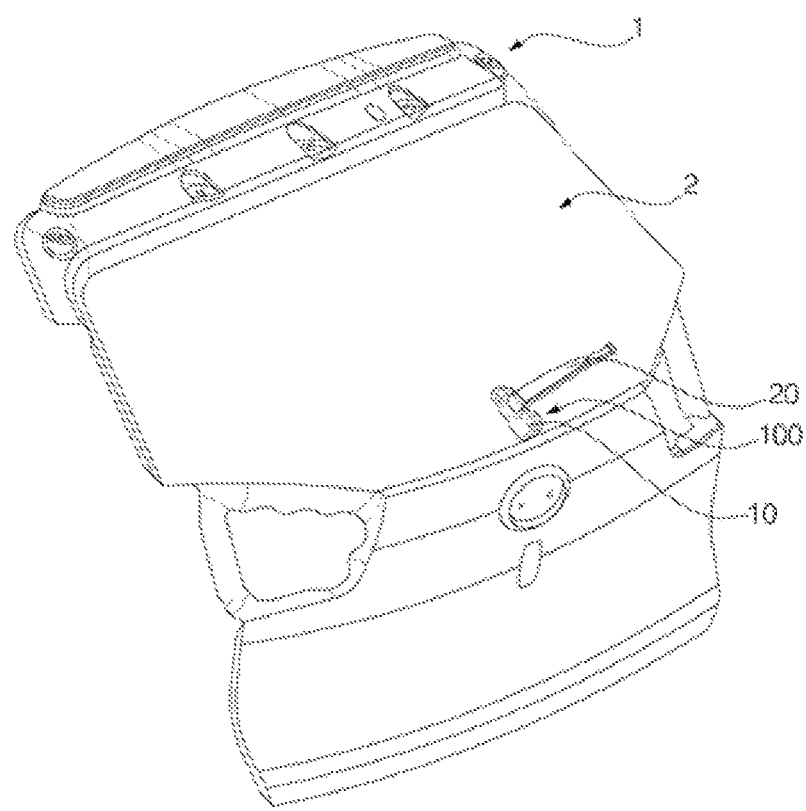
FIG. 1 is a view illustrating a trunk lid disposed at a rear side of a vehicle in accordance with an embodiment of the present invention.
Figure 2:
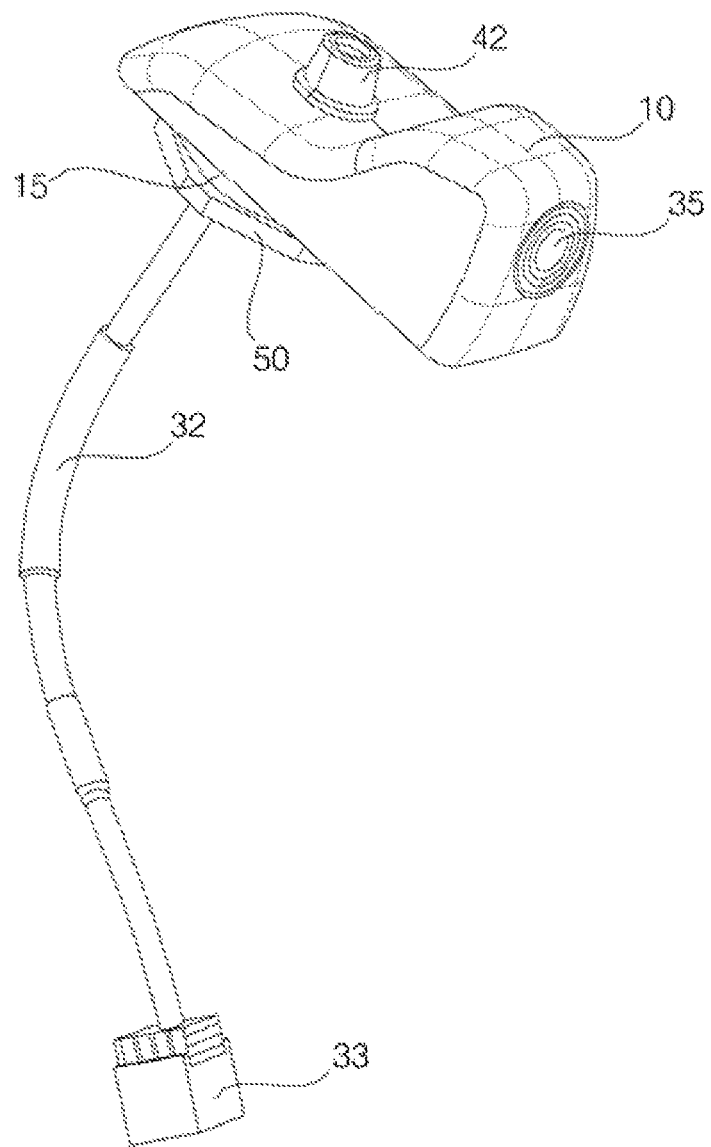
FIG. 2 is a view illustrating a rear camera device for the vehicle illustrated in FIG. 1.
Figure 3:
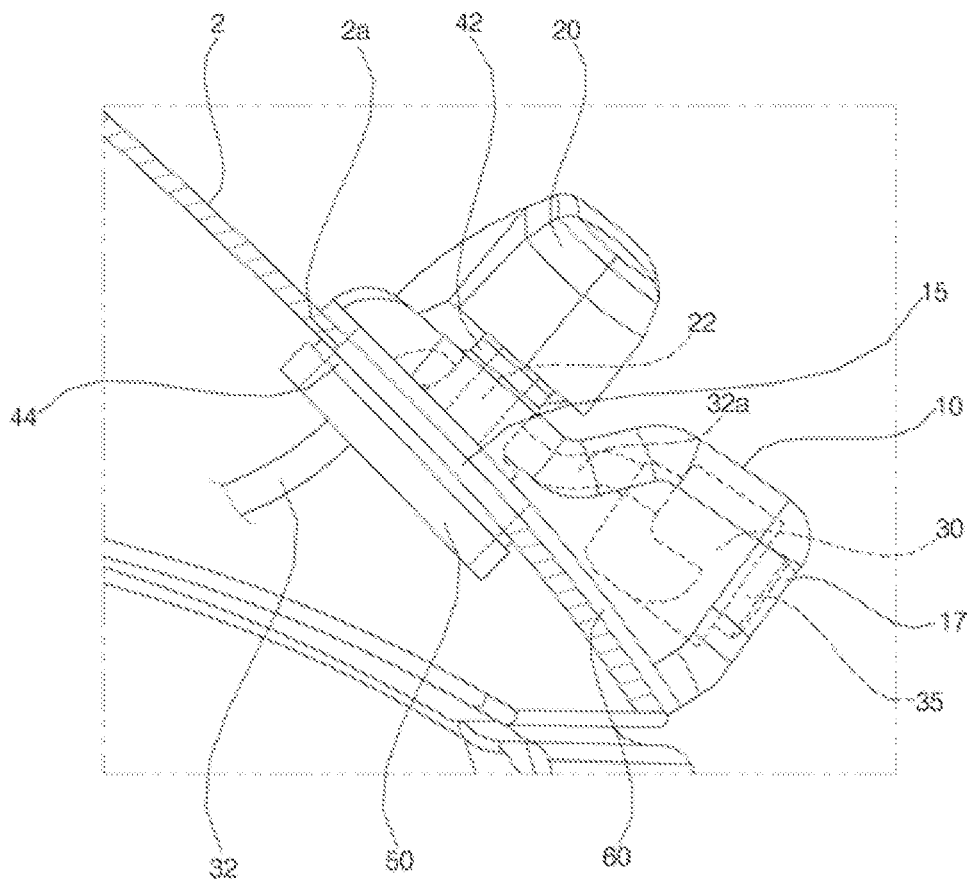
FIG. 3 is a view illustrating a state in which the rear camera device of FIG. 1 is installed at the vehicle.

FIG. 1 is a view illustrating a trunk lid disposed at a rear side of a vehicle in accordance with an embodiment of the present invention. FIG. 2 is a view illustrating a rear camera device for the vehicle illustrated in FIG. 1. FIG. 3 is a view illustrating a state in which the rear camera device of FIG. 1 is installed at the vehicle.

Referring to FIGS. 1 to 3, at a rear portion of a vehicle where a rear camera device 100 according to an embodiment of the present invention is installed, a trunk lid is provided to open or close a trunk. The trunk lid 1 includes a rear window 2. The rear window 2 not only performs a function for preventing rain, snow or foreign matter from entering a passenger compartment, but also allows passengers to view an outside of the vehicle from within the passenger compartment.

The rear camera device 100 is installed at the rear window 2. The rear camera device 100 includes a module cover 10, a rear wiper 20, and a rear camera module 30.

The module cover 10 is mounted to the rear window 2, for installation of the rear wiper 20 and camera module 20. The module cover 10 has a lower surface contacting an outer surface of the rear window 2. The rear window 2 has a curved surface having a predetermined curvature and, as such, the lower surface of the module cover 10 has a curvature corresponding to that of the curved surface of the rear window 2.

The module cover 10 is formed, at the lower surface thereof, with a mounting portion 15 protruding from the lower surface. The mounting portion 15 is inserted into a mounting hole 2a formed through the rear window 2. The mounting portion 15 has a cylindrical shape. The mounting portion 15 is inserted into the mounting hole 3a from the outside of the rear window 2 such that a rear end of the mounting portion 15 protrudes inwards of the rear window 2. A fastening nut 50 is fastened to the rear end of the mounting portion 15 protruding inwards of the rear window 2. Threads may be formed at an outer circumferential surface of the mounting portion 15, to be engaged with threads formed at an inner circumferential surface of the fastening nut 50. As the fastening nut 50 is fastened to the mounting portion 15, the module cover 10 is coupled to the rear window 2.

A first watertight pad 60 is interposed between the outer surface of the rear window 2 and the lower surface of the module cover 10. The first watertight pad 60 prevents foreign matter such as rain from penetrating the passenger compartment through the mounting hole 2a formed at the rear window 2. The first watertight pad 60 may be laid on the outer surface of the mounting portion 15 formed at the module cover 10 before the mounting portion 15 is inserted into the mounting hole 2 formed at the rear window 2. When the module cover 10 is coupled to the rear window 2 by the fastening nut 50, the mounting portion 15 extends through the first watertight pad 60.

A second watertight pad 44 is also interposed between an inner surface of the rear window 2 and the fastening nut 50. The second watertight pad 44 not only prevents foreign matter such as rain from penetrating into the passenger compartment, but also prevents the fastening nut 50 from coming into contact with the rear window 2. When the module cover 20 is coupled to the rear window 2 by the fastening nut 50, the mounting portion 15 extends through the second watertight pad 44.

The rear wiper 20 functions to clean the rear window 2. The rear wiper 20 includes a blade closely contacting the outer surface of the rear window 2. When a motor operates, the rear wiper 20 cleans the rear window 2 while pivoting along the outer surface of the rear window 2 and, as such, functions to remove rain, snow or foreign matter from the rear window 2.

The rear wiper 20 includes a rotational shaft 22 rotatably coupled to the module cover 10. A cover hole is formed at the module cover 10. A grommet 42 is fitted in the cover hole of the module cover 10, to surround an outer circumferential surface of the rotational shaft 22 of the rear wiper 20.

The rotational shaft 22 of the rear wiper 20 may be a rotational shaft of the motor to operate the rear wiper 20.

The grommet 42 may be made of an elastic material such as rubber. The grommet 42 has an upper end protruding upwards from the module cover 10.

The grommet 42 prevents the rotational shaft of the rear wiper 20 from interfering with the module cover 10 and, as such, allows the rotational shaft of the rear wiper 20 to rotate smoothly during pivoting of the rear wiper 20.

The rotational shaft of the rear wiper 20 extends through the grommet 42 such that a portion thereof is positioned within the module cover 10, and the remaining portion thereof protrudes upwards of the module cover 10. The rear wiper 20 is connected to the protruding portion of the rotational shaft.

The rear camera module 30 photographs a rear-view image of the vehicle, and sends the photographed rear-view image to a display device mounted in the passenger compartment, to enable the driver to secure a rear view of the vehicle without turning his head. The rear camera module 30 is installed within the module cover 20, to be covered by the module cover 10.

A mounting space may be defined between the module cover 20 and the rear window 2, to mount the rear camera module 30 within the module cover. The mounting space may be formed within the module cover 10. The module cover 10 is formed with an opening 17 at a portion thereof corresponding to a lens 35 of the rear camera module 30 in order to allow the rear camera module 30 to photograph a rear-view image of the vehicle through the lens 35.

A cable 32 is connected to the rear camera module 30, not only to supply electric power to the rear camera module 30, but also to send the image photographed by the rear camera module 30. The cable 32 includes wires for supplying electric power, and wires for sending an image. The cable 32 is coupled, at one end thereof, to the rear camera module 30 while being coupled, at the other end thereof, to a connector 33. The cable 32 may be connected to a controller to control the rear camera module 30, by the connector 33.

The cable 32 connected to the rear camera module 30 may extend from the module cover 10 inwards of the rear window 2 through the mounting portion 15 of the module cover 10 and, as such, the connector 33 may be coupled to the cable 32 inside the rear window 2. Thus, the connector 22 may be connected to the controller.

The cable 32 may pass through the mounting portion 15 after extending through the grommet 42.

As apparent from the above description, in the vehicle according to the illustrated embodiment of the present invention, the rear camera module 30 is installed at the module cover 10, together with the rear wiper 20, and, as such, the process of mounting the rear camera module 30 may be simplified, and the exterior design of the vehicle may be improved.

Those skilled in the art to which the present invention pertains can appreciate that the invention may be embodied in other specific forms without changing the technical spirit or essential characteristics. Therefore, the embodiments described above should be understood as exemplary rather than limiting in all aspects. The scope of the present invention should also be interpreted by the claims below rather than the foregoing description. The meaning and range of the claims and all modifications as would be derived from the equivalent concept intended to be included within the scope of the present invention should also be interpreted as falling within the scope of the invention.

What is claimed is:

1. A rear camera device for a vehicle comprising:
   a module cover configured for being mounted to a rear side of the vehicle such that a rotational shaft of a rear wiper is rotatably coupled to the module cover; and
   a rear camera module installed at the module cover, and configured to photograph a rear-view image of the vehicle,
   wherein the module cover is coupled to a rear window,
   wherein the module cover is formed with a mounting portion to be inserted into a mounting hole formed through the rear window,
   wherein a fastening nut is fastened to the mounting portion to couple the module cover to the rear window.

2. The rear camera device according to claim 1, wherein the rear camera module is disposed in a space defined in the module cover.

3. The rear camera device according to claim 1, wherein the module cover is formed with an opening at a portion thereof corresponding to a lens of the rear camera module.

4. The rear camera device according to claim 1, further comprising:
   a grommet inserted into a cover hole formed through the module cover such that an upper end of the grommet protrudes upwards from the module cover, the grommet surrounding the rotational shaft while allowing the rotational shaft to rotate.

5. The rear camera device according to claim 4, further comprising:
   a cable connected to the rear camera module while extending through the grommet, to apply a control signal to the rear camera module.

6. The rear camera module according to claim 1, wherein the rear camera module is disposed in a space defined between the module cover and the rear window.

7. The rear camera module according to claim 1, further comprising:
   a first watertight pad interposed between the rear window and the module cover, the mounting portion extending through the first watertight pad.

8. The rear camera module according to claim 7, further comprising:
   a second watertight pad interposed between the rear window and the fastening nut, the mounting portion extending through the second watertight pad.

* * * * *